United States Patent [19]

Dubow

[11] 4,301,879
[45] Nov. 24, 1981

[54] BODY WEIGHT SCALE WITH HISTORICAL RECORD DISPLAY

[76] Inventor: Arnold A. Dubow, 6104 Stearns Hill Rd., Waltham, Mass. 02154

[21] Appl. No.: 125,131

[22] Filed: Feb. 27, 1980

[51] Int. Cl.³ .................... G01G 23/38; G01G 23/32
[52] U.S. Cl. .......................................... 177/5; 177/178
[58] Field of Search ............................. 177/5, 178, 25; 346/9–11

[56] References Cited

U.S. PATENT DOCUMENTS

| | | | |
|---|---|---|---|
| 3,512,593 | 5/1970 | Edmondson | 177/5 |
| 3,967,690 | 7/1976 | Northcutt | 177/25 |
| 4,113,039 | 9/1978 | Ozaki et al. | 177/25 |
| 4,137,567 | 1/1979 | Grube | 177/25 X |
| 4,153,122 | 5/1979 | Engels et al. | 177/25 |

Primary Examiner—George H. Miller, Jr.
Attorney, Agent, or Firm—Kenway & Jenney

[57] ABSTRACT

A body weight scale system with historical display. The system includes a transducer for generating a succession of digital weight signals representative of a user's body weight at a succession of points in time. The system further includes a data entry device which provides time signals representative of the points in time associated with the various weight signals. A data processing network stores the time and weight signals, selectively extracts those signals and generates display signals representative of the body weight of the person as a function of time. A display is responsive to the display signals to display information representative of this time function.

10 Claims, 3 Drawing Figures

BODY WEIGHT SCALE WITH HISTORICAL RECORD DISPLAY

BACKGROUND OF THE INVENTION

The present invention relates to body weight measuring systems and more particularly to such measuring systems with historical record display.

In the prior art, personal body weight scales typically include a spring loaded, graduated disc coupled to a weighing platform so that the weight of a person on the platform causes the disc to be angularly displaced by an amount proportional to the weight. The graduated disc generally includes a set of calibrated points which, as the disc is angularly displaced, pass before a transparent window and a pointer to provide an analog read-out of the weight of the person on the weighing platform.

With the advent of low cost digital electronics, the conventional analog personal weight scale has been supplemented in the marketplace by newly developed digital personal body weight scales. In such systems, a variety of force sensors may be used to obtain a digital signal representative of the person's body weight. Such sensors may include the rotating disc arrangement noted above, wherein that disc includes a digital position read-out device for generating such a digital weight signal. The digital weight signals are then conventionally displayed on a digital read-out, such as a light emitting code (LED) display, or a liquid crystal display (LCD). Such systems are known to provide easily-read personal body weight scales.

It is also known to combine such digital scales with digital networks to provide weight-related information. For example, U.S. Pat. No. 4,113,039 discloses a body weight digital scale in combination with a digital processor which compares a measured weight with a selected reference value (associated with the user's height and age), and generates a signal indicating whether the user is over, at, or below his "normal" weight at a point in time.

Yet another of such prior art systems is represented by U.S. Pat. No. 3,967,690. This patent discloses a digital read-out diet scale which provides a dieter with a signal which may be selectively chosen to be representative of either his weight, or a change of weight with respect to a previous measurement. While this latter system does provide information which is of importance to the dieter, the displayed information is only representative of a change from a single previous data point. In view of this feature, a dieter may be extremely frustrated by the relatively slow change in his weight over a period of time, since he can only view a weight at a previous moment in time.

Accordingly, it is an object of this invention to provide a digital personal weight monitoring system with an historical record display of the user's weight as measured at a succession of weigh-ins.

SUMMARY OF THE INVENTION

Briefly, the body weight scale with historical display in accordance with the present invention includes a transducer having a force sensor and associated digital weight signal generator, for providing digital weight signals representative of the body weight of the person in sensed relation with the sensor, i.e. on the scale. The system further includes a data entry device which is adapted to generate a time signal representative of the point in time associated with the generation of a weight signal. A system memory is provided for storing the time and weight signals. A controller is adapted to address the memory in a manner to control the storage and extraction of the generated time and weight signals. In addition, the controller provides signal processing to selectively extract the stored time and weight signals and generate display signals representative of the body weight of the person as a function of time. An output device, such as an LED display or hard copy printer, is responsive to the display signals to display or printout information representative of this time function. Consequently, the user may monitor his weight variation over a succession of weigh-in's. Thus, with the present invention, users, such as dieters and other persons concerned with monitoring of their body weight, may readily observe trends in their weight variation.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
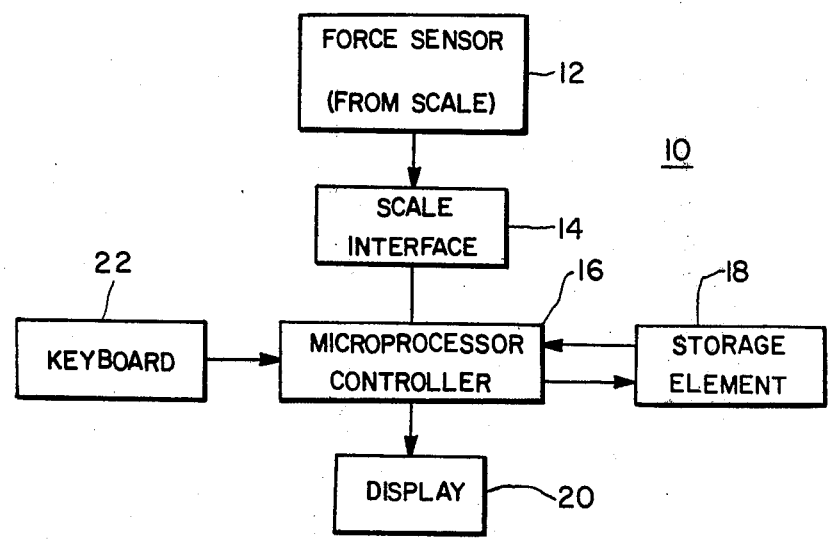
FIG. 1 shows, in block diagram form, an exemplary system embodying the present invention.

FIG. 1 shows one form of the invention intended for use as a "bathroom" scale having a digital display. The system 10 includes a force sensor (or scale) 12 and an associated scale interface 14. The sensor 12 and interface 14 may be a conventional type digital scale providing output signals representative of the weight of a body on a sensing surface or platform. The sensor 12 and interface 14 are coupled directly to a microprocessor controller 16, which in turn is coupled to an associated random access memory (RAM), denoted as storage element 18. Controller 16 is also coupled to a display device 20 and to a data entry device in the form of a keyboard 22. By way of example, the display device 20 may be a two dimensional display matrix (for example, including an mxn cell array of light emitting diodes, where m and n are integers). The keyboard 22 is adapted to provide user-generated information, such as date and user.

More specifically, in operation, a user first may key in an identity signal and a date code signal at keyboard 22, and then get on the scale weighing platform. The microprocessor controller 16 then receives the weight signal generated by the scale 12 (by way of interface 14) and stores that signal in the storage element 18, together with the date code signal and identity data signal generated at the keyboard 22. The user may enter a request at keyboard 22 to the controller 16 to display all of his weight data stored in the storage element 18. The microprocessor 16 then extracts that user's stored weight data from the storage element 18 and generates the display signals for controlling the display 20 to display the user's weight as a function of time.

Figure 2:
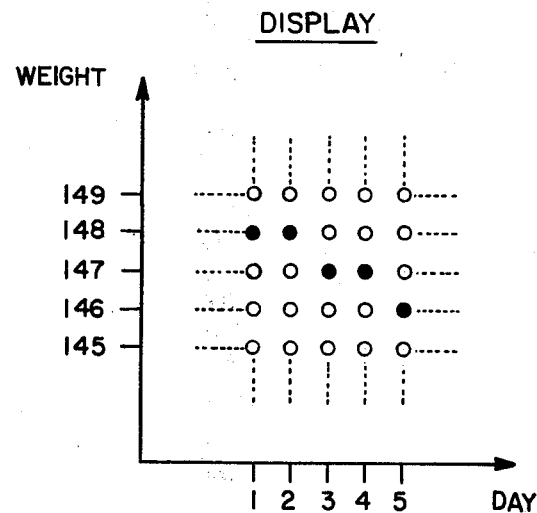
FIG. 2 illustrates the display on the system of FIG. 1.

By way of example, FIG. 2 illustrates a 5×5 cell portion of a dot matrix array of LED's forming display 20. The illuminated cells of the display are denoted in FIG. 2 by the solid circles, while the hollow circles represent non-illuminated LED's. In FIG. 2, a five day period is indicated, where the weight of the person was 148 weight units (e.g. Pounds) for days 1 and 2, then 147 weight units for days 3 and 4, and finally 146 weight units for day 5. In variations of this embodiment, the cells for the respective days 1 through 5 which lie either below or above the illustrated illuminated cells, may also be illuminated to provide an area-type display. Thus, the presently described display shows a person's weight over a five-day period, thereby providing a substantial amount of information to that person to show the historical record of his weight.

In other forms of the invention, the display 20 may include a dot matrix array of cells which each may be controlled to be in a reflective or non-reflective state for example where each cell is a liquid crystal display element. In this form, the respective cells may be selectively controlled to be either in their reflective or non-reflective state in the same manner in which the LED cells described above are controlled to be in their illuminated or non-illuminated state. In other forms of the invention different types of display cells may be used.

Figure 3:
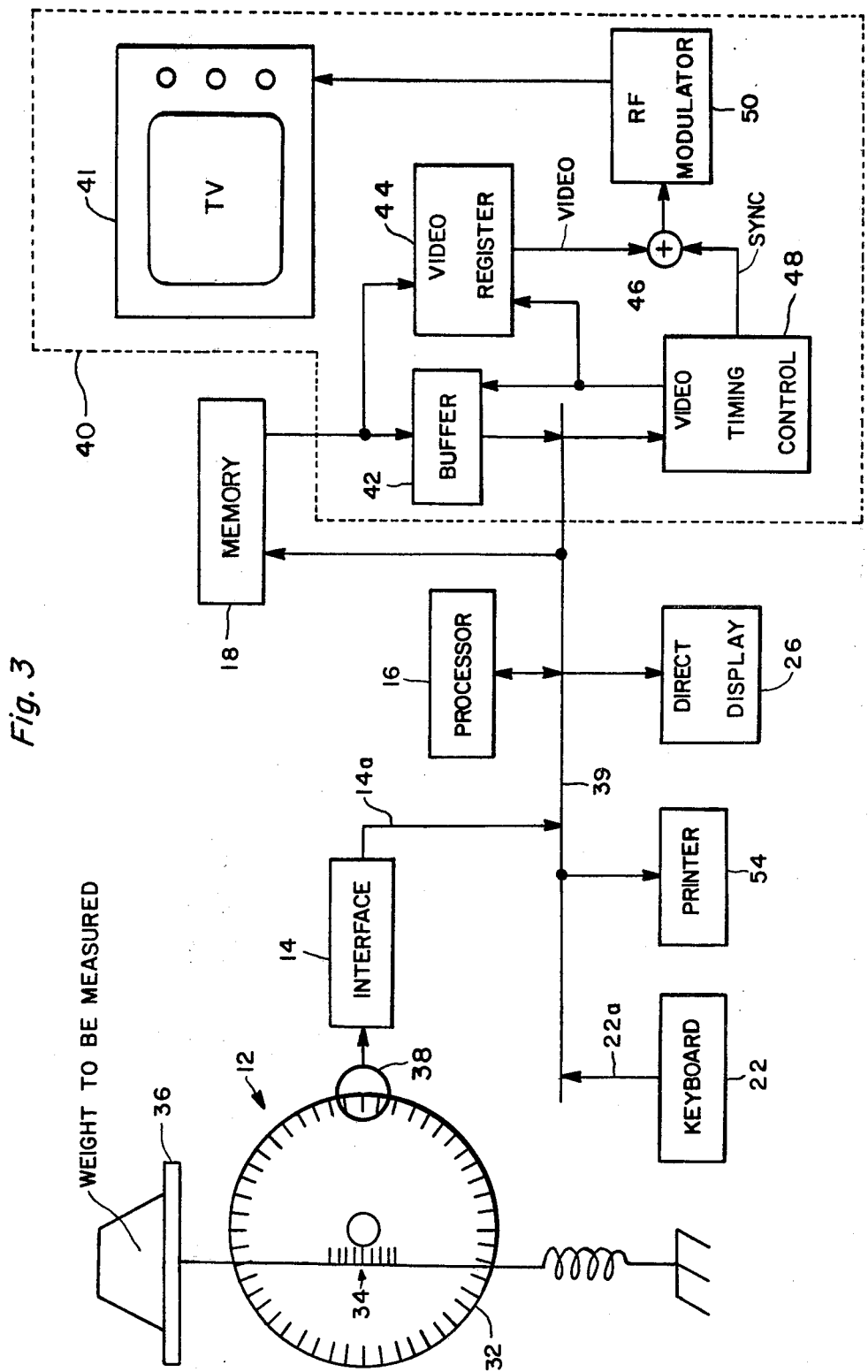
FIG. 3 shows, in block diagram, an alternative embodiment of the present invention.

FIG. 3 shows an alternative embodiment of the present invention adapted for use with a conventional television, where the cathode ray tube (CRT) serves as a device for displaying a continuous line representative of a person's weight as a function of time. In the embodiment of FIG. 3, elements corresponding to elements shown in the embodiment of FIG. 1 are denoted by identical reference designations.

In the configuration of FIG. 3, the force sensor 12 includes a conventional-type, rotatable disc 32 having graduations near its peripheral edge. The disc 32 is coupled by a gearing arrangement 34 to a spring-loaded weighing platform 36 which supports the body to be measured. An optical sensor 38 and associated light beam generator are adapted to sense the rotational movement of disc 32 and by way of interface 14 provide (on line 14a) a digital signal representative of the rotational position of disc 32. The weight signal on line 14a is coupled to a system data bus 39.

The system shown in FIG. 3 includes a processor 16, and memory 18, direct display 20 and control keyboard 22 coupled to the data bus 39. In addition, an alternative display network 40 is also coupled to bus 39. Network 46 is adapted for operating a conventional television monitor 41 and includes conventional TV interface elements: buffer 42, video register 44, summing network 46, video timing control 48 and RF modulator 50. The latter elements are conventionally arranged to convert the storage digital data signals to corresponding video signals for driving the television monitor 41.

In operation, a weight on the platform 36 causes the encoding disc 32 to rotate, interrupting a light beam received by the optical sensor 38. Processor 16 reads the output of the sensor 38 and converts the received information into suitable display signals for display 20 in the manner disclosed above in conjunction with FIG. 1. In addition, the user can select the place in which the data is placed in the memory in order to accommodate multiple users. The user can direct processor 16 to generate continuous line segment on the CRT of television 41 which is representative of his body weight as a function of time. Generally, in this latter mode, the processor 16 sequences the memory 18 through the section which has been loaded with the user's weight data. The stored information is extracted from the memory 18 and is serialized by the video register 44 for display. A video signal is summed with this serialized video information, and the composite signal then used to modulate an RF carrier in RF modulator 50. The resultant RF signal is directly used by television display 41. In various embodiments, the video display driver may also be adapted to provide an illuminated region on one side of the line segment generated as described above. That region may lie, for example, below the line segment, or encompass all areas in the field of display above the line segment.

The embodiment of FIG. 3 also shows another form of display device which is a hard copy printer 54 coupled to bus 39 which may be used with or in place of the other display devices. By way of example, the printer may be a conventional impact or strip chart printer controlled by processor 16 to provide either a dot-type display or continuous line display of the user's weight as a function of time.

While the presently-described embodiments are directed to systems which display the historical record of a single user, it will be understood that the invention may readily be configured to accommodate multiple users, by storing the various weight signals together with user-entered identification tags and then sorting the stored information during the extraction and display drive signal generation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A digital body weight scale system with historical display, comprising:
   A. transducer including a force sensor and associated means for generating digital weight signals representative of the body weight of a person in sensed relation with said sensor,
   B. data entry means for generating a digital time signal representative of a point in time associated with the generation of one of said weight signals,
   C. storage means for storing said time signals and said weight signals,
   D. control means including addressing means for controlling the storage of said time signals and said weight signals in said storage means, and further including signal processing means for selectively extracting said stored time and weight signals and generating display signals therefrom, said display signals being representative of the body weight of said person as a function of time, and
   E. display means responsive to said display signals for displaying information representative of said body weight as a function of time,
   wherein said display includes:
   a rectangular array of selectively operative light generating cells including a succession of m columns of cells, each column having n cells therein where m and n are integers, wherein the cells of each column in said succession are associated with a corresponding point of a succession of points in time, and each cell of a column is representative of a predetermined weight associated with the point in time for that column, and means responsive to said display signals to selectively illuminate at least one cell in each column having an associated point in time corresponding to the point in time associated with said generation of one of said weight signals, said one illuminated cell being representative of the body weight represented by that weight signal.

2. A system according to claim 1 wherein said selective illuminating means includes means to illuminate the cells in said columns below said one illuminated cell in said columns.

3. A system according to claim 1 wherein said selective illuminating means includes means to illuminate the cells in said columns above said one illuminated cell in said columns.

4. A digital body weight scale system with historical display, comprising:
   A. transducer including a force sensor and associated means for generating digital weight signals representative of the body weight of a person in sensed relation with said sensor,
   B. data entry means for generating a digital time signal representative of a point in time associated with the generation of one of said weight signals,
   C. storage means for storing said time signals and said weight signals,
   D. control means including addressing means for controlling the storage of said time signals and said weight signals in said storage means, and further including signal processing means for selectively extracting said stored time and weight signals and generating display signals therefrom, said display signals being representative of the body weight of said person as a function of time, and
   E. display means responsive to said display signals for displaying information representative of said body weight as a function of time,
   wherein said display includes:
   means for displaying a continuous line segment in a two dimensional field, where said line segment is single-valued in one of said dimensions, said one dimension being representative of time and said other dimension being representative of body weight, and
   means responsive to said display signals to selectively control said line display means whereby said line segment includes points in said field representative of said sensed body weights at corresponding weight signal generation times.

5. A system according to claim 4 wherein said line segment displaying means is a cathode ray tube and associated drive networks.

6. A system according to claim 4 wherein said line display control means includes means to display the area in said field below said displayed line segment.

7. A system according to claim 4 wherein said line display control means includes means to display the area in said field above said displayed line segment.

8. A digital body weight scale system with historical display, comprising:
   A. transducer including a force sensor and associated means for generating digital weight signals representative of the body weight of a person in sensed relation with said sensor,
   B. data entry means for generating a digital time signal representative of a point in time associated with the generation of one of said weight signals,
   C. storage means for storing said time signals and said weight signals,
   D. control means including addressing means for controlling the storage of said time signals and said weight signals in said storage means, and further including signal processing means for selectively extracting said stored time and weight signals and generating display signals therefrom, said display signals being representative of the body weight of said person as a function of time, and
   E. display means responsive to said display signals for displaying information representative of said body weight as a function of time,
   wherein said display includes:
   a rectangular array of selectively operative light reflective cells including a succession of m columns of cells, each cell being selectively operable in a reflective state and a non-reflective state with respect to incident light, wherein each column has n cells therein where m and n are integers, wherein the cells of each column in said succession are associated with a corresponding point of a succession of points in time, and each cell of a column is representative of a predetermined weight associated with the point in time for that column, and
   means responsive to said display signals to selectively control at least one cell to be in its reflective state in each column having an associated point in time corresponding to the point in time associated with said generation of one of said weight signals, said one reflective state cell being representative of the body weight represented by that weight signal.

9. A system according to claim 8 wherein said selective control means includes means to control the cells in said columns below said one reflective state cell in said columns to be in their reflective state.

10. A system according to claim 8 wherein said selective control means includes means to control the cells in said columns above said one reflective state cell in said columns to be in their reflective state.

* * * * *